April 5, 1966  C. R. COPELAND  3,244,497
GLASS PRESS MOLD STRUCTURE WITH TEMPERATURE REGULATION
Filed Sept. 27, 1962  2 Sheets-Sheet 2

INVENTOR.
CLINTON R. COPELAND
ATTORNEYS

United States Patent Office 3,244,497
Patented Apr. 5, 1966

3,244,497
GLASS PRESS MOLD STRUCTURE WITH
TEMPERATURE REGULATION
Clinton R. Copeland, East Rochester, N.Y., assignor to Bausch & Lomb Incorporated, Rochester, N.Y., a corporation of New York
Filed Sept. 27, 1962, Ser. No. 226,508
5 Claims. (Cl. 65—162)

This invention relates to glass forming means and more particularly to a mold for forming lens blanks.

In the ophthalmic industry there has been a need for molding lens elements which are of substantially the same size and weight as the finished lens blank and also accurately conforming to the same shape of the finished blank. In order to mold a lens blank meeting these rigid requirements it is necessary to control the temperature of the mold, maintain finishes and curvatures, and provide good parting characteristics of mold surfaces. Accordingly this invention provides a means whereby the curvature and the dimensions of the mold are substantially equal to the curvature and dimensions of the lens blank.

It is an object of this invention to provide a means for molding an optical element.

It is another of this invention to provide a mold for lens blank which is thermally insulated to substantially reduce the heat transfer from the mold to ambient air and supporting structure.

It is a further object of this invention to provide a mold for lens elements which substantially reduces the heat transfer from the mold and controls the dimensional tolerances of the surfaces in the mold which contact the lens blank during the molding operation.

It is a further object of this invention to provide a mold for ophthalmic lens blanks which is thermally insulated and has heating and cooling means to control the thermal and dimensional tolerances on all surfaces contacting the lens blank during the formation of the blank.

The objects of this invention are accomplished by providing a mold for lens blanks which is supported by point contact on the supporting structure for the mold. An insulating means including an insulating material and an airspace is intermediate the mold and the supporting structure to reduce any heat transfer from the mold to the supporting structure. This eliminates any warpage of the supporting structure due to heating caused from the mold.

A plunger operating within a sleeve engages the lower portion of the mold to form a lens blank. Both the upper and lower portions of the mold are provided with temperature regulating means to automatically control the temperature in the mold within close limits. In this manner each of the blanks are molded under substantially the same physical and thermal conditions and therefore provides uniformity of quality which is necessary to produce the optical excellence required in the ophthalmic lens blank.

The preferred embodiment of this invention is illustrated in the attached drawings and described in the following paragraphs.

Figure 1:
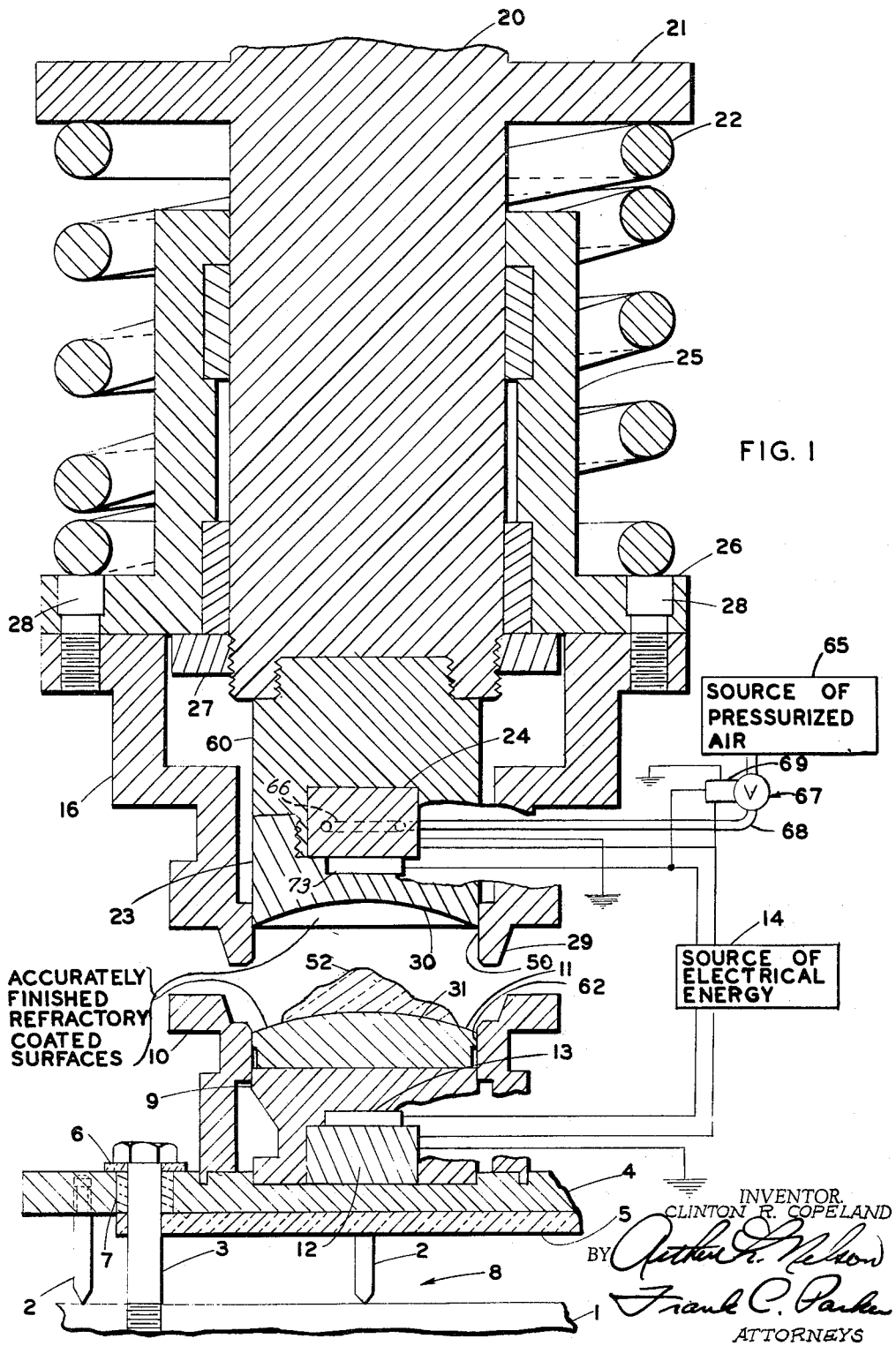
FIG. 1 illustrates a cross section view of the mold mounted on a supporting structure.

Referring to FIG. 1 a press table 1 provides a supporting means for the mold structure. The point contacts are formed on the ends of pins 2 which engage the table 1. A plurality of bolts 3 threadedly engage the table and hold the plate 4 in fixed relation to the table. Intermediate the plate 4 and the table 1 is positioned the insulator 5. An insulating washer 6 and sleeve 7 insulate the bolt 3 from the plate 4 and thermally isolate the mold from the table 1. The airspace 8 is also intermediate the insulator 5 and the table 1 further reducing heat transfer from the mold to the plate.

The plate 4 carries the base 9 and the cylinder 10 which receives the base. An insert 11 is also received within the central opening of the cylinder 10 and forms the engaging surface contacting the lens blank as it is being molded. The heating element 12 is positioned within the base 9 and automatically controlled by means of the thermal regulator 13. The heating element 12 is electrically connnected to the source of electrical energy 14. The regulator 13 is electrically connected to the heating element 12 through the source of electrical energy to automatically maintain predetermined limits of temperature change in the insert 11 in the lower half of the mold 40.

The upper portion of the mold carries the plunger 23 having a surface 30 which engages molten glass more regularly than the lower portion of the mold. For this reason it is a possibility that the plunger 23 might be overheated due to the contact with the molten glass. Accordingly the cooling arrangement is used together with a heating element 24 in the upper half of the mold. The heating element 24 and regulator 73 are electrically connected to the source of electrical energy to heat the plunger automatically. A source of pressurized air 65 in communication with a cooling chamber 66 through the solenoid valve 67 is in the conduit 68. The regulator element 73 is electrically connected to the solenoid 69. The regulator 73 automatically regulates the valve 67 through the solenoid 69 which is also connected to the source of electrical energy 14. The heating element 24 supplies heat for the plunger 23 and cooling chamber 66 provides a cooling means for the plunger 23. Both the cooling and heating means are automatically regulated by the regulator 73 to provide a constant temperature for the plunger 23.

The upper half of the mold is connected to a ram 20 having a radial flange 21 engaging the spring 22. The ram 20 extends downwardly and threadedly engages the spacer 60 which is connected to the plunger 23 and also receives the heating element 24. The bushing 25 receives the end portion of the ram and also forms a radial flange 26 engaging the spring 22. The bushing 55 is biased to a downward position as indicated and seats on the ring 27 which is fixed to the ram 20. The plurality of bolts 28 connect the radial flange 26 of the bushing 25 to the sleeve 16. The sleeve 16 has a frusto-conical section 29 which aids initially in the alignment of the sleeve 16 as the ram 29 moves the plunger 23 downwardly. The surface 30 is formed to create the curvature on the convex portion of the lens blank. The curvature 30 and 31 engage the major surfaces of the lens blank and control the configuration on the lens blank.

Figures 3, 4:
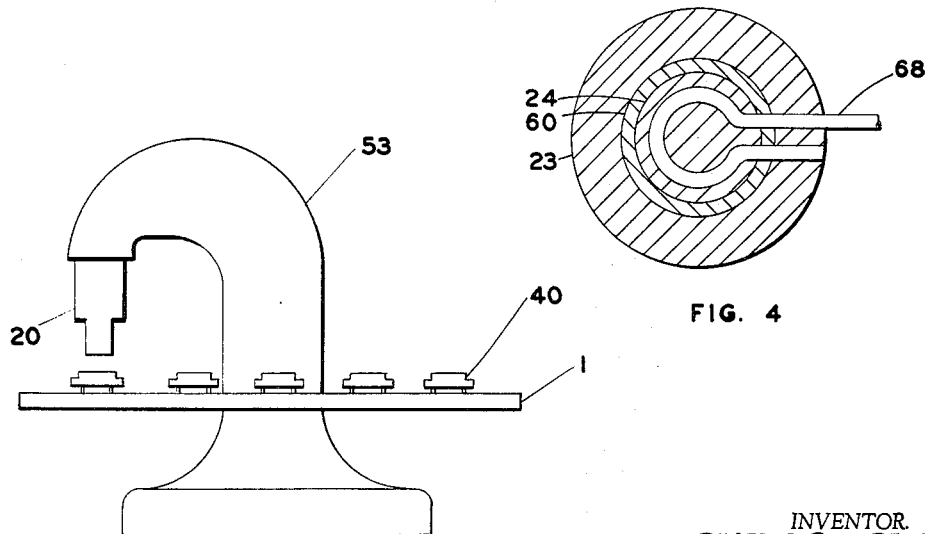
FIG. 3 illustrates a typical press which might be used in molding the lens blank.
FIG. 4 is a cross section view taken on line 4—4 of FIG. 2.

The mold as illustrated in FIG. 1 is in the open position and the upper and lower portions of the mold are aligned axially. The table 1 as illustrated in FIG. 3 is rotatable about an axis and moves through a plurality of stations. A predetermined weight of molten glass is received within the lower portion of the mold while in one of these stations. A plurality of these lower portions 40 are indicated as they are supported on the table 1 for rotation with the table. As the mold half 40 moves into the station for the pressing operation it is illustrated as the station under the ram 20. FIG. 3 schematically illustrates the ram and lower portion 40 of the mold axially aligned prior to the molding operation.

Figure 2:
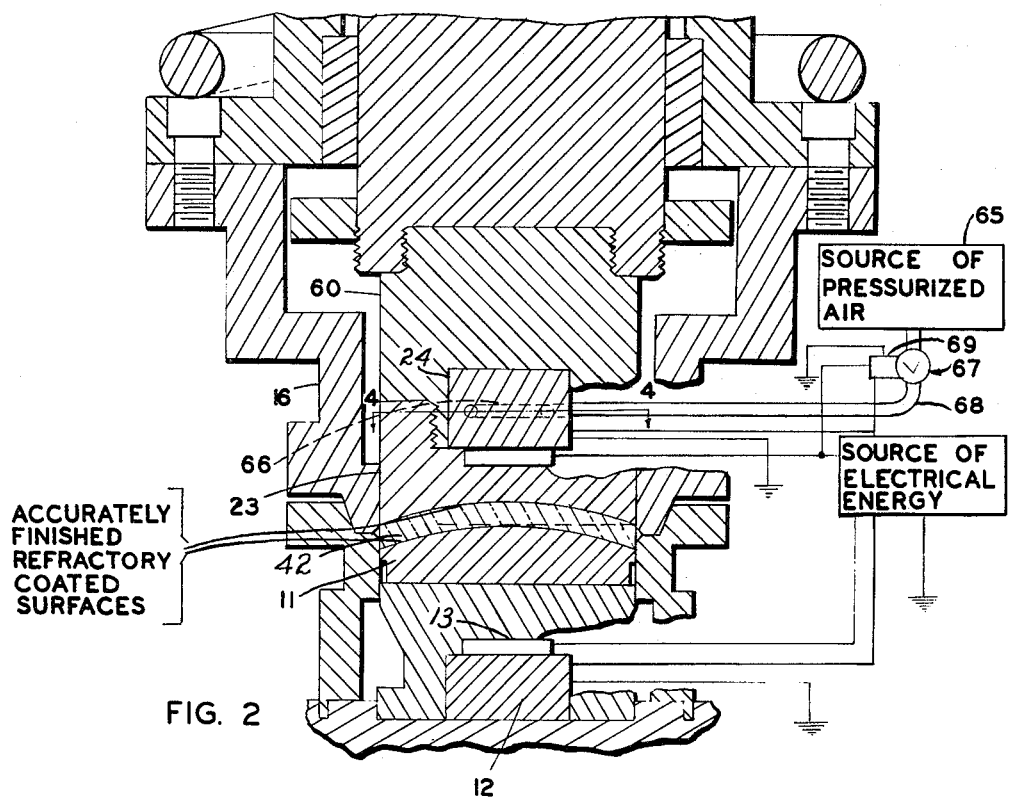
FIG. 2 is a cross section view similar to FIG. 1 except the mold is illustrated in the closed position.

FIG. 2 illustrates the lens blank 42 within the mold as it is being pressed during the molding operation. The curvature of the plunger 23 and the insert 11 are transmitted to the lens blanks 42. With the maintenance of temperatures within close limits it is possible to place a curvature on these elements which is transmitted to the molded lens blank. This curvature is sufficiently close to form unfinished surfaces substantially equal dimensionally to finished lens blank. The other surface may be finished through a polishing operation to maintain high standards of optical lens quality. In this manner a minimum of glass is removed from the lens blank to provide an ophthalmic lens blank of salable quality.

The inner surfaces of the mold structure are finished surfaces. These surfaces include the surface 30 of the plunger 23, and surface 31 of the insert 11 as well as the cylindrical inner surface 50 of the sleeve 16, and the cylindrical inner surface 62 of the cylinder 10. To form a quality lens blank these surfaces are finished to a close tolerance and mirror finish and then preferably coated with an extremely thin layer of refractory having a very high evaporating temperature. The surfaces must form a lens of good image transmitting quality. The coating is so thin that the mirror finish surface of the metal forming the mold structure forms the characteristic surface of the refractory material. The layer thickness would be approximately ½ wavelength of light in the visible spectrum. More specifically this may be considered a yellow-green light in the middle of the spectrum. With a mirror finish on the metal base receiving the coating, the coating itself will produce a like finish. This means their is no necessity for refinishing the film once the film is deposited. The coating protects the metal from heat and acts as a parting agent between the mold surfaces and the molten glass. The glass has no affinity for the coating whereas it may have an affinity for the metal base upon which the coating is deposited. Due to the thinness of the coat, breakage, crystallization and decomposition are uncommon. The coatings might be of a group such as refractory nitrides, borides and boride complexes, carbides and oxides. For the purpose of illustration the coating being extremely thin, it is difficult to illustrate this on a drawing so that the surfaces 30, 31, 50 and 62 are considered to be thin coatings of the refractory material.

The molding device operates in the following described manner. A predetermined amount of molten glass 52 is deposited in the lower portion of the mold as indicated in FIG. 1. The molten glass is in a heavy viscous state and slowly flows over the curved surface 31 on the insert 11. Upon rotation of the table 1 the lower portion of the mold is aligned with the ram 20 on the press 53. As the press is operated the ram 20 is moved downwardly until the sleeve 16 sets firmly within a cylinder 10. Further pressure generated on the ram 20 causes a continued downward movement of the ram until the surface 30 of the plunger 23 engages the molten glass 52. The molten glass is forced to contact all the surfaces on the inner portion of the mold which are coated by the refractory material. This position of the mold elements is illustrated in FIG. 2. The curvature of the mold and dimensions within the mold are transmitted to the molten glass causing the formation as indicated in FIG. 2.

The position of the lens blank in the concave downward position assists in the natural flow of the molten glass to the edges and minimizes the movement of molten glass caused by the plunger 23 as the mold closes. It is important that the heat is controlled on both the plunger and the insert 31 to form a quality lens blank. If the temperature is too low a chill wrinkle is formed on the lens blank causing a defective blank which must be rejected. Likewise if the temperature of the contacting surfaces of the mold engaging the lens blanks are too high the blank has a tendency to fuse within the mold and difficulty is experienced in removing the lens from the mold.

Consider the press table 1 carrying nine lower sections 40 of the mold. The table rotates through nine stations from the time the lens blank is formed and during which the lens blank is removed until a new deposit of molten glass is placed within the lower section 40 of the mold. With this type of operation the plunger 23 engages molten glass nine times as often as the insert 11. Accordingly a different temperature control must be used to regulate the temperatures of each of these two elements forming the major surfaces on the lens blank.

Due to the greater frequency of the contact by plunger 23 relative to the insert 11 the plunger also carries means for cooling the plunger. This cooling is accomplished through the cooling chamber 66 which is automatically regulated in response to the regulator 73 which is electrically connected to the solenoid 69 of the solenoid valve 67. Both systems work automatically to provide an even operating temperature for the plunger 23. The insert 11 might be provided with a similar cooling arrangement if the quantity of glass being run through the mold required such a cooling facility. For the purpose of lens blanks as illustrated it is not believed to be necessary to provide such cooling means.

During the cycling of the press the table 1 rotates and the lens blank is removed by an automatic means then deposited on a conveyer from which the blank is carried to an annealing process.

For the production of a quality lens blank it is imperative that all mold surfaces be maintained within predetermined close temperature limits and all surfaces must be accurately finished and coated to provide the desired parting characteristics of the lens blank as it is separated from the mold surface. The thickness of the lens blank is substantially thinner than those made by conventional methods and due to its thinness permits a fairly accurate temperature control of the blank itself. The temperature of the blank is controlled by the plunger 23 and insert 11. The blank is placed in an annealing furnace to reduce internal strain, and then gradually reduced to room temperature. A finished curvature is transmitted from the plunger 23 and the insert 11 and therefore a minimum of polishing is required to produce an ophthalmic lens blank of salable quality.

The preferred embodiments of this invention have been illustrated and described. It is understood that other modifications may be devised which would fall within the scope of the invention. The following attached claims are considered to cover the applicant's invention.

I claim:

1. A mold structure for molding lens blanks comprising, a mold base, temperature regulated means associated with said mold base for maintaining a substantially constant temperature of said base, a plunger for operating with said base forming a lens blank cavity, temperature regulating means associated with said plunger for maintaining a substantially constant plunger temperature, a rigid supporting table providing a solid mounting structure, a limited contact support means intermediate said supporting table and said base reducing heat transfer to a minimum, insulating means intermediate said mold base and said supporting table thereby limiting heat transfer from said mold to a point external of said mold and maintain substantially constant dimensions and temperatures within the mold cavity for molding precision lens blanks of optical excellence.

2. An ophthalmic lens blank mold comprising, a mold base, heating means for heating said base, temperature regulating means associated with said base and with said heating means for maintaining a substantially constant temperature of said base, plunger means operating with said base and forming a lens blank cavity, heating means for said plunger means, cooling means for said plunger means, temperature regulating means associated with said plunger heating and cooling means for maintaining a temperature of said plunger means, a rigid supporting table forming a rigid support, insulating means intermediate said supporting table and said mold base substantially reducing heat transfer between said base and said supporting table, finished internal surfaces substantially identical to the curvature desired on a finished lens blank formed on the lens cavity forming portion of said plunger means and said mold base, a thin refractory coating formed on said surfaces having dimensional and surface characteristics of the metallic finished surfaces of said plunger means and said mold base and forming a parting agent adapted for parting from the finished lens blank and thereby transmitting finished curved surfaces to the major curved surfaces of the lens blank.

3. A glass mold for producing optical elements of optical excellence comprising, a mold base, heating means for said base, temperature regulated means associated with said heating means and with said mold base maintaining a constant temperature of said mold base, plunger means operating with said mold base and forming a lens blank cavity, heating means for said plunger means, temperature regulated means associated with said plunger means and said plunger heating means for maintaining a substantially constant temperature of said plunger means, a rigid supporting table for eliminating deformation of the mold during molding operations, a point contact engaging said supporting table and supporting said mold base, insulating means intermediate said mold base and said supporting table insulating said mold base from said supporting table, a predetermined finished surface formed on the portion, each of said plunger means and said mold base forming the lens blank cavity substantially simulating the finished curvature and finished surface of an image transmitting lens blank, a refractory coating of a refractory having a high vapor pressure of approximately ½ wavelength of light thickness forming a parting agent and a precision surface having the characteristics of the finished metallic surface of said plunger means and said mold base for transmitting the desired curvature to a lens blank during molding operation.

4. A glass molding device for producing optical elements of image transmitting quality comprising, a rigid rotary table rotating about an axial center, a plurality of planetary arranged mold bases arranged about the axis of table rotation, limited contact means supporting said mold bases and forming a limited contact with the rotary table providing a minimum of heat transfer from the mold bases to said table, heating means for said mold bases, a temperature regulated means for said heating means maintaining substantially constant temperature of said mold bases, a plunger sequentially and axially aligned with each of said plurality of mold bases, heating means for said plunger, cooling means for said plunger, a temperature regulated means controlling said plunger heating means and cooling means for maintaining a substantial constant temperature of said plunger means, predetermined finished surfaces formed on the portions of each of said plunger means and said mold bases forming a lens blank cavity substantially simulating the finished surface of image transmitting lens blank, a refractory coating of a refractory material coating the surface forming the lens blank cavity, thereby providing molding surfaces of substantially constant temperature with a minimum of dimensional deformation during molding operation to impart finished surfaces to lens blanks.

5. A glass mold for producing optical elements of image transmitting quality comprising, a rigid rotating table rotating about a central axis, a plurality of mold bases in planetary arrangement about the axis of rotation of said table, heating means for said mold bases, temperature regulated means for said heating means maintaining substantially constant the temperature of said mold bases, limited contact supporting means and insulating means intermediate said table and said mold bases to limit the heat transfer from said mold bases to said table, a plunger means sequentially forming a lens cavity with said mold bases when axially aligned with each of said plurality of mold bases upon rotation of said table, heating means and cooling means maintaining a substantially constant temperature of said plunger means, means rotating and indexing said table with mold bases in sequential alignment with said plunger means, precision finished surfaces formed on the portions of said plunger means and said mold bases forming surfaces capable of imparting image transmitting quality lenses, a thin refractory coating on said surfaces having the characteristics of the finished metal surface of said plunger means and providing a parting agent for easy removal of the lens blank from said lens cavity.

References Cited by the Examiner
UNITED STATES PATENTS

| | | | |
|---|---|---|---|
| 1,603,025 | 10/1926 | Clarke | 65—361 X |
| 1,857,540 | 5/1932 | Hardenberg | 65—319 |
| 1,878,485 | 9/1932 | Ganter | 65—308 X |
| 2,201,049 | 5/1940 | Moore | 65—26 |
| 2,410,616 | 11/1946 | Webb | 65—162 X |
| 2,432,668 | 12/1947 | Kingston | 65—319 X |

DONALL H. SYLVESTER, *Primary Examiner.*

A. D. KELLOGG, *Assistant Examiner.*